2,756,220
RUBBER CHEMICAL AND USE THEREOF

Marvin C. Brooks, Packanack Lake, and Ray K. Kuhns, Glen Rock, N. J., assignors to United States Rubber Company, New York, N. Y., a corporation of New Jersey No Drawing. Application August 23, 1952,
Serial No. 306,054

10 Claims. (Cl. 260—41.5)

This invention relates to a new class of rubber chemicals and to utilization of these chemicals in rubber-filler mixtures whereby vulcanizates having improved physical properties are obtained.

The copending application of Brooks and Ewart, Serial No. 250,788, filed October 10, 1951, discloses that by incorporating the reaction products of organohalosilanes and polyhydric alcohols into uncured mixtures of rubber and certain fillers, an improvement in the physical properties of vulcanizates prepared therefrom is obtained.

We have now found that the addition of vinylchlorosilane-hydrogen sulfide reaction products (vinyl silthianes) to uncured rubber-filler mixtures also brings about improvements in the physical properties of the resulting vulcanizates. The improvements brought about by the vinyl silthianes are of the same nature as those obtained with vinylchlorosilane-glycol reaction products in accordance with the above-mentioned application. The beneficial effects of the vinyl silthianes are, however, of considerably greater magnitude. Moreover, whereas the vinylchlorosilane-glycol reaction products are effective, to any appreciable degree, only in rubber-filler mixtures in which the filler is a specific silica or silicate product, especially calcium silicate or kaolin (clay), the vinyl silthianes are effective in rubber-filler mixtures regardless of the type of filler contained therein. Of particular interest is the fact that the vinyl silthianes effect improvements in the properties of vulcanizates containing carbon black and calcium carbonate, whereas the vinylchlorosilane-glycol reaction products have virtually no effect on the physical properties of vulcanizates containing these types of fillers.

The copending applications of Brooks et al., Serial No. 256,144, filed November 13, 1951 (now U. S. Patent 2,665,264), Boggs, Serial No. 261,361, filed December 12, 1951, and Ladd, Serial No. 266,099, filed January 11, 1952, are all based upon the discovery that the physical properties of rubber-filler vulcanizates are improved by the use therein of fillers which have been pre-treated, or are treated during intermixture with the elastomer, with certain organohalosilanes. The improvements obtained by the use of the thus-treated fillers are the same as those obtained by the addition of a reaction product of the silane and a polyhydric alcohol directly to a rubber-filler mixture in the manner disclosed in the above-identified Brooks et al. application Serial No. 250,788. It has heretofore been concluded from this similarity of results that the silane-polyhydric alcohol reaction product reacted with the filler in the elastomer-filler mixture and thereby effected a beneficial change in the reinforcing characteristics of the filler, similar to that which is obtained when the filler was treated with an organohalosilane prior to its addition to the rubber. Although we do not wish to be limited to any theory in the explanation of the results of our invention, it appears that the reaction of our vinyl silthianes in a rubber-filler mixture is generally similar to that of the silane-polyhydric alcohol reaction products.

The vinylchlorosilanes which we employ in making our silthianes are those in which all four valences of the silicon are satisfied by vinyl and chloro only.

In accordance with our invention we first react the vinylchlorosilane with hydrogen sulfide. This reaction is accompanied by liberation of an amount of hydrogen chloride corresponding to the amount of chlorine in the vinylchlorosilane and chemical attachment of the silicon atom to one, two or three sulfur atoms, depending upon the number of chlorine atoms originally present in the vinylchlorosilane.

For example when vinyltrichlorosilane is employed, the product of the reaction with the hydrogen sulfide contains the recurring unit structure

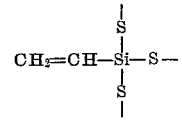

and analysis of the product shows that its content of carbon, hydrogen, silicon and sulfur responds to the empirical formula $CH_2{=}CHSiS_{3/2}$. Each of the dangling valences attached to sulfur in the foregoing unit structure is in turn attached to another silicon atom to which is attached a vinyl group.

In a typical method of preparing the reaction product of our invention, hydrogen sulfide in gaseous form is bubbled through a liquid mixture containing the vinylchlorosilane and a hydrogen chloride acceptor, preferably pyridine. It is preferable that an inert solvent for the reactants and for the vinylchlorosilane-hydrogen sulfide reaction product be present in the reaction vessel. Benzene is especially suitable as a solvent. An amount of hydrogen chloride acceptor should be used which is at least sufficient to combine with all of the hydrogen chloride evolved during the reaction. We prefer to effect reaction by heating the solution of the vinylchlorosilane, hydrogen chloride acceptor, and inert solvent under reflux conditions, and to bubble the hydrogen sulfide gas through the solution while it is being refluxed. If desired, any suitable means for obtaining intimate contact between the hydrogen sulfide gas and the liquid reaction mixture can be provided. As the reaction proceeds the reaction product of the hydrogen chloride acceptor and the liberated hydrogen chloride is of course formed and usually separates out as a precipitate. When the reaction is complete, as is indicated by cessation of absorption of hydrogen sulfide, the reaction product is recovered from the reaction mixture in any suitable manner. It is noteworthy that the hydrogen sulfide selectively reacts with the chlorine in the vinylchlorosilane so as to replace chlorine with sulfur and that almost no reaction of hydrogen sulfide across the double bonds of the vinyl groups takes place.

The following example illustrates the preparation of one of our vinyl silthiane reaction products in more detail.

EXAMPLE I

Six hundred grams of vinyltrichlorosilane and 960 grams of pyridine are dissolved in 1600 ml. of benzene. The mixture is then heated to reflux temperature and hydrogen sulfide is bubbled therethrough. As the reaction proceeds a heavy crystalline mass of pyridine hydrochloride forms. Introduction of the hydrogen sulfide is continued until its reaction with the silane ceases (as judged from bubble tubes for hydrogen sulfide located at the entrance to and exit from the reaction vessel).

When the hydrogen sulfide is no longer absorbed in the reaction mixture, the pyridine hydrochloride is filtered out and the filter cake washed in benzene. The wash fluid and the filtrate are then combined and the low-boiling fractions thereof removed by distillation at low pressure (30 mm.) and low temperature. The temperature is raised, during the course of the distillation, from 75° C. at the start to 125° C. at the finish.

The residue in the reaction vessel is the reaction product of our invention. It is a viscous liquid at 125° C. and a waxy solid at room temperature. It hydrolyzes in moist air, smells strongly of hydrogen sulfide, dissolves almost completely in xylene and dioxane, and swells slightly in paraffin hydrocarbons.

Analysis of the vinyltrichlorosilane-hydrogen sulfide reaction product indicates the unit structure is $$CH_2 = CHSiS_{3/2}$$

The analytical data are summarized in the following table. The theoretical values in the table are based on a compound having the above unit structure.

| Element | Percent in Reaction Product | Percent Theoretical |
|---|---|---|
| Chlorine | 0.4 | 0.0 |
| Sulfur | 42.3 | 46.5 |
| Silicon | 26.9 | 27.2 |
| Hydrogen | 3.1 | 2.9 |
| Carbon | 24.2 | 23.3 |

The yield of reaction product is 344 grams, compared to a theoretical yield of 384 grams.

The reaction products of divinyldichlorosilane, or trivinylchlorosilane, and hydrogen sulfide are prepared in similar fashion.

The vinyl silthianes of our invention are incorporated with elastomer-filler blends in any suitable manner, usually by adding them to the elastomer-filler mixture and incorporating them thoroughly therewith in standard rubber mixing equipment, such as the open rubber mill or an internal mixer such as a Banbury mixer. It is conceivable that the filler might be pretreated with the vinyl silthiane reaction products of our invention, for example with a solution thereof in a solvent medium, prior to incorporation of the filler into the elastomer. However, it is not likely that this method would offer any substantial advantage over pre-treatment of the filler with the vinylchlorosilane directly.

As the vinyl silthiane is intermixed with the blend of elastomer and filler, hydrogen sulfide is released. Part of this hydrogen sulfide is absorbed by the elastomer and the remainder is released into the surrounding atmosphere. It is therefore preferable that provision be made at the mixing apparatus to remove hydrogen sulfide vapors. Exhaust hoods above the ram used at the top of internal mixers of the Banbury type are in common use and provide adequate means for removal of the hydrogen sulfide vapors.

For good results it is essential that the mixture of elastomer, filler and vinyl silthiane be heated at an elevated temperature in order to effect the desired reaction between the vinyl silthiane and the filler. Temperatures of the order of 250° to 400° F. are necessary to effect this reaction at a practical speed. We much prefer to mill or masticate the mixture while heating it to such temperatures. The desired mastication and high temperature are easily obtained in the ordinary Banbury mixer. Following completion of the reaction between the silthiane and the filler, as is evidenced by cessation of liberation of hydrogen sulfide, the mixture is cooled to a temperature substantially below 250° F., say to 150° F., or to any other temperature at which undesired reaction of the vulcanizing ingredients will not take place. Thereupon a suitable amount of sulfur and suitable proportions of vulcanization accelerators are intimately admixed at such low temperatures.

If a softener is to be used in the formulation, it is often desirable to have it present during the reaction between the silthiane and the filler.

The resulting mixture is then shaped and vulcanized in the conventional manner.

Natural rubber or any synthetic rubber containing at least 25% of combined butadiene can be used in the practice of our invention. The synthetic rubber can be either rubbery polybutadiene, i. e., the homopolymer of butadiene, or a copolymer of 25% or more of butadiene copolymerized with up to 75% of any suitable copolymerizable monomer such as styrene, acrylonitrile, esters of acrylic acid such as methyl acrylate or ethyl acrylate, esters of methacrylic acid such as methyl methacrylate, and the like. The rubber used can be classed as a sulfur-vulcanizable conjugated diolefin polymer rubber.

Any filler commonly used in rubber compounding can be used in the practice of our invention. Examples are the precipitated hydrated silicas, precipitated hydrated calcium silicates, any of the clays commonly used as rubber fillers, diatomaceous earth, titanium dioxide, aluminum oxide, carbon black, calcium carbonate, etc. It is demonstrated in the following examples that the process of our invention causes an increase in the tensile strength of vulcanizates, generally a reduction in their permanent set, an increase in their modulus, and a reduction in their torsional hysteresis. The extent of these changes in the physical properties varies to a considerable degree depending on the filler employed in the vulcanizate. For example, although the treatment of our invention in general significantly improves the hot tensile strength of vulcanizates, it may be accompanied by slight impairment of room temperature tensile strength when hydrated precipitated silicas, hydrated precipitated calcium silicates, or aluminum oxide are employed as fillers.

The amount of the vinylchlorosilane-hydrogen sulfide reaction product employed in the elastomer-filler mixture can vary widely. Generally speaking however it will usually range from 0.5% to 10% of the filler weight. More commonly it will range from 1 to 5% of the filler weight. As may be anticipated, stocks filled with fine particle fillers require a greater amount of vinyl silthiane than do stocks filled with large particle fillers.

The following examples illustrate the utilization of our vinylchlorosilane-hydrogen sulfide reaction products in elastomer-filler mixers and the improvements in representative physical properties thereby obtained. All parts are by weight.

EXAMPLE II

This example illustrates the improved reinforcing properties imparted to fillers by the reaction products of our invention. A portion of the silthiane product of Example I was incorporated in a GR-S stock containing "Hi-Sil" silica as the filler. "Hi-Sil" silica is a precipitated hydrated silica which has a particle size of about 200 Angstrom units, a surface area of 150 square meters per gram, and a degree of hydration of 10.7% of moisture. For comparison purposes a stock containing diethylene glycol was prepared at the same time. The use of diethylene glycol for improving the properties of silica-filled stocks is disclosed in U. S. patent to Pechukas 2,564,992. The formulations were as follows:

| | Stocks | |
|---|---|---|
| | I-A | I-B |
| GR-S | 100 | 100 |
| Coumarone Resin (softener) | 10 | 10 |
| "Hi-Sil" silica | 54 | 54 |
| Vinyltrichlorosilane-hydrogen sulfide reaction product (of Example I) | | 4 |
| Diethylene glycol | 3 | |
| Stearic acid | 1 | 1 |
| Zinc oxide | 3 | 3 |
| Accelerators | 2 | 2 |
| Sulfur | 3 | 3 |

The method of mixing involved blending the GR-S, the coumarone resin, the "Hi-Sil" silica, the stearic acid and the reaction product or the diethylene glycol in the cold and milling the mixture for 10 minutes at 300° F. The remaining ingredients were then added on a 150° F. mill.

The hot milling was carried out in order to give the silane-H₂S reaction product used in stock I-A opportunity to react with the filler. The test stock smelled of hydrogen sulfide until the hot milling treatment. After the hot milling, the test compound had no more odor than the control compound. The stocks were press-cured for forty-five minutes at 292° F. The physical properties of the cured stocks were as indicated in the following table.

Table I

| Stock | Room Temperature | | | | | 212° F. | 280° F. |
|---|---|---|---|---|---|---|---|
| | Durometer | Tensile | Elong. | Set at Break | Modulus, 300% Strain | Tensile | Tors. Hyst. |
| I-A | 61 | 2,580 | 550 | 37 | 1,050 | 915 | .15 |
| I-B | 63 | 2,520 | 320 | 16 | 1,850 | 1,140 | .07 |

The improvements in hot tensile (212° F.), set at break, torsional hysteresis, and modulus imparted by our reaction product, are apparent from the data shown in Table I.

Although our invention is not limited to use with any particular class of fillers, we find that particularly good results are obtained with silica, silicate, titanium dioxide, and aluminum oxide fillers. The following example illustrates the improvement obtained by treatment of a large variety of these fillers with our reaction product.

EXAMPLE III

GR-S stocks were prepared in accordance with the formulations listed below. Equal volumes of fillers were used.

STOCKS

| | III-A | III-B | III-C | III-D | III-E | III-F | III-G | III-H | III-I | III-J |
|---|---|---|---|---|---|---|---|---|---|---|
| GR-S | 100 | 100 | 100 | 100 | 100 | 100 | 100 | 100 | 100 | 100 |
| Reaction product[1] | | 2 | | 2 | | 2 | | 2 | | 2 |
| "Silene EF" | 58 | 58 | | | | | | | | |
| "Suprex Clay" | | | 72 | 72 | | | | | | |
| "Celite 505" | | | | | 60 | 60 | | | | |
| "Titanox" | | | | | | | 107 | 107 | | |
| Alumina C-730 | | | | | | | | | 67 | 67 |
| Coumarone Resin | 10 | 10 | 10 | 10 | 10 | 10 | 10 | 10 | 10 | 10 |
| Stearic Acid | 1 | 1 | 1 | 1 | 1 | 1 | 1 | 1 | 1 | 1 |
| Zinc Oxide | 3 | 3 | 3 | 3 | 3 | 3 | 3 | 3 | 3 | 3 |
| Accelerators | 2 | 2 | 2 | 2 | 2 | 2 | 2 | 2 | 2 | 2 |
| Sulfur | 2.5 | 2.5 | 2.5 | 2.5 | 2.5 | 2.5 | 2.5 | 2.5 | 2.5 | 2.5 |

[1] Vinyltrichlorosilane-hydrogen sulfide reaction product (made as in Example I).

"Silene EF" which was added to stocks III-A and III-B is a hydrated calcium silicate having a particle size of about 300 Angstrom units and containing about 13-19% water of hydration. "Suprex Clay," which was added to stocks III-C and III-D, is a kaolin having plate-like particles of a wide distribution of sizes averaging approximately 5000 Angstrom units and containing 14.1% of water of hydration. "Celite 505" is an amorphous diatomaceous earth having an average particle size of approximately 5 microns. "Titanox" is an anatase crystal type titanium dioxide having a particle size of less than 0.5 micron. "Alumina C-730" is a hydrated aluminum oxide having a 36% water of hydration and an average particle size of less than 0.6 micron.

The stocks were processed in the same manner as were the stocks in Example II. They were then press-cured for 45 minutes at a temperature of 292° F. The physical properties of the resultant vulcanizates are listed in the following table.

Table II

| Stock (R. P.=Vinytrichlorosilane—H₂S Reaction Product) | Room Temperature | | | | | 212° F. | 280° F. |
|---|---|---|---|---|---|---|---|
| | Durometer | Tensile | Elong. | Percent Set at Break | Modulus, 300% St. | Tensile | Tors. Hyst. |
| III-A (Silene EF) | 54 | 2,290 | 620 | 35 | 675 | 760 | .099 |
| III-B (Silene EF+R. P.) | 59 | 2,020 | 450 | 16 | 1,140 | 860 | .079 |
| III-C (Clay) | 55 | 1,470 | 560 | 34 | 720 | 425 | .109 |
| III-D (Clay+R. P.) | 55 | 2,040 | 310 | 11 | 1,875 | 1,050 | .071 |
| III-E (Diatomaeceous Earth) | 65 | 830 | 260 | 12 | ¹645 | 285 | .089 |
| III-F (Diatomaceous Earth+R. P.) | 66 | 1,370 | 250 | 7 | ¹1,180 | 640 | .059 |
| III-G (Titanium Oxide) | 53 | 2,240 | 680 | 26 | 360 | 355 | .091 |
| III-H (Titanium Oxide+R. P.) | 58 | 2,460 | 470 | 14 | 1,180 | 840 | .057 |
| III-I (Aluminum Oxide) | 46 | 1,690 | 670 | 25 | 300 | 180 | .072 |
| III-J (Aluminum Oxide+R. P.) | 52 | 1,400 | 480 | 13 | 800 | 495 | .064 |

¹ 200% strain.

The data summarized in Table II illustrate clearly the improvement in physical properties obtainable by the process of our invention. Particular attention is directed to the clay-filled stocks which are outstandingly improved by our invention.

As previously stated, our vinylchlorosilane-hydrogen sulfide reaction product effects a greater improvement than do vinylchlorosilane-glycol reaction products. A good demonstration of this is the example of a clay-filled stock. The physical properties of a GR-S vulcanizate containing clay that has been treated with a vinyltrichlorosilane-diethylene glycol reaction product are summarized in the following table. For comparison a stock containing no reaction product is also included.

Table III

| Stock | Room Temperature | | | | | 212° F. Tens. | 280° F. T.H. |
|---|---|---|---|---|---|---|---|
| | Durometer | Tensile | Elong. | Percent Set at Bk. | Mod., 300% St. | | |
| Clay (control) | 60 | 1,740 | 570 | 35 | 915 | 475 | .1 |
| Clay+vinyltrichlorosilane glycol reaction product | 62 | 1,610 | 440 | 21 | 1,350 | 775 | .07 |

The stocks in Table III were compounded similarly to those in Table II except that 3.0 parts of sulfur was used rather than 2.5 parts. When the data in Table III are compared with those for clay in Table II, the superiority of our treating agent is immediately evident. The tensile, percent set at break and modulus data are particularly illustrative of this fact.

Other fillers which heretofore have been considered inert to chemical treatment respond to treatment in accordance with the process of our invention. Two good examples of such fillers are carbon black and calcium carbonate. The following example illustrates their treatment by the process of our invention and the improvement in their reinforcing properties thus obtained.

EXAMPLE IV

Four GR-S stocks were prepared in accordance with the following formulations. The stocks were processed similarly to those in Example II.

|  | Stocks | | | |
|---|---|---|---|---|
|  | IV-A | IV-B | IV-C | IV-D |
| GR-S | 100 | 100 | 100 | 100 |
| Carbon black |  |  | 50 | 50 |
| Witcarb R-12 | 75 | 75 |  |  |
| Reaction product [1] |  | 2 |  | 2 |
| Coumarone resin | 10 | 10 |  |  |
| "Paraflux" (Hydrocarbon Softener for rubber) |  |  | 6 | 6 |
| Stearic acid | 1 | 1 | 2 | 2 |
| Zinc oxide | 3 | 3 | 3 | 3 |
| Accelerators | 2 | 2 | 1.5 | 1.5 |
| Sulfur | 2.5 | 2.5 | 2.25 | 2.25 |

[1] Vinyltrichlorosilane-H$_2$S reaction product (made as in Example I).

The carbon black employed was a medium processing channel black. "Witcarb R-12" is a precipitated calcium carbonate having a particle size of approximately 0.15 micron.

The stocks were press-cured by heating with steam at 292° F. for 45 minutes. The physical properties of the resultant vulcanizates are listed in the following table.

Table IV

| Stock | Room Temperature | | | | | 212° F. Tens. | 280° F. T. H. |
|---|---|---|---|---|---|---|---|
|  | Durometer | Tensile | Elong. | Percent Set at Bk. | Mod., 300% St. |  |  |
| IV-C (Carbon black) | 65 | 3,150 | 450 | 11 | 1,575 | 1,120 | .19 |
| IV-D (Carbon black+reaction product) | 65 | 3,510 | 440 | 12 | 2,050 | 1,320 | .09 |
| IV-A (Calcium carbonate) | 50 | 1,530 | 640 | 30 | 330 | 256 | .09 |
| IV-B (Calcium carbonate+reaction product) | 52 | 1,840 | 620 | 30 | 560 | 397 | .08 |

EXAMPLE V

The use in GR-S of fillers treated in accordance with the process of our invention has been illustrated in Examples II, III and IV. In Table V are shown data on vulcanizates of two other copolymers of butadiene, viz., a butadiene-acrylonitrile copolymer (GR-A) and a butadiene-methylmethacrylate copolymer. Each vulcanizate contains clay ("Suprex Clay") as a filler.

The stocks were compounded and processed similarly to the GR-S stocks in Examples II and III, except for slight modifications in acceleration.

Two parts of our vinyltrichlorosilane-hydrogen sulfide reaction product were used in the treated stocks. The improvements in physical properties imparted by the process of our invention are evident from the data in Table V.

Table V

| Stock | Room Temperature | | | | | 212° F. Tens. | 280° F. T. Hyst. |
|---|---|---|---|---|---|---|---|
|  | Durometer | Tensile | Elong. | Percent Set at Break | Modulus, 300% St. |  |  |
| Butadiene-Acrylonitrile containing: |  |  |  |  |  |  |  |
|   clay | 60 | 1,720 | 420 | 23 | 1,420 | 545 | .094 |
|   clay+vinyl-trichloro-silane-H$_2$S reaction product [1] | 62 | 2,040 | 250 | 11 | 2,100 | 921 | 72 |
| Butadiene-methylmethacrylate containing: |  |  |  |  |  |  |  |
|   clay | 53 | 950 | 400 | 30 | 720 | 255 | .13 |
|   clay—vinyl-trichloro-silane-H$_2$S reaction product [1] | 55 | 1,090 | 410 | 24 | 875 | 370 | .109 |

[1] Made as in Example I.

The products formed by the reaction of saturated organochlorosilanes with hydrogen sulfide, e. g., the reaction product of ethyltrichlorosilane and hydrogen sulfide, effect only minor improvements in the physical properties of the vulcanizates.

Although we prefer to use copolymers of butadiene as the rubber in the process of our invention, natural rubber stocks may also be used. For example, clay-filled natural rubber vulcanizates prepared according to the process of our invention, although displaying only small improvements in tensile strength and torsional hysteresis, were improved in modulus from 1310 to 1760. The permanent set of the vulcanizate was reduced from 54% at break to 33%.

From the foregoing description many advantages of the present invention will be readily apparent to those skilled in the art. The principal advantage is that the present invention provides a simple and commercially feasible method of greatly improving the physical properties of synthetic rubber vulcanizates based on butadiene polymers and copolymers filled with the common fillers of the rubber industry. Another advantage is that the present invention makes it possible to prepare and market at relatively low cost a valuable new rubber chemical which can be used by rubber compounders in a way which does not require any extensive deviation from conventional compounding practices and which does not entail the use of special equipment. A marked advantage of our invention is that it enables considerable improvement in physical properties of vulcanizates containing such cheap and commonly available rubber fillers as carbon black and calcium carbonate which are not susceptible to improvement by treatment in accordance with the disclosures of the above-identified patent applications. Numerous other advantages of our invention will be apparent to those skilled in the art.

Having thus described our invention, what we claim and desire to protect by Letters Patent is:

1. The method which comprises commingling a sulfur-vulcanizable conjugated diolefin polymer rubber, a filler, and from 0.5 to 10%, on the weight of the filler, of a vinyl silthiane, and heating the mixture at a temperature of at least 250° F. to effect reaction between said vinyl silthiane and said filler, the said vinyl silthiane being the product of interaction of a vinylchlorosilane wherein the sum of the vinyl and chloro groups is equal to 4 with hydrogen sulfide passed in gaseous form into a solution at reflux temperature of said vinylchlorosilane, in the presence of a hydrogen chloride acceptor, to effect liberation of an amount of hydrogen chloride corresponding to the amount of chlorine in the vinylchlorosilane, whereby there is formed a vinyl silthiane consisting of vinyl groups, silicon atoms and sulfur atoms, each of said silicon atoms being chemically attached to vinyl groups and sulfur atoms, the sum of the number of vinyl groups and sulfur atoms to which each of said silicon atoms is attached being equal to 4.

2. The method which comprises commingling a sulfur-vulcanizable conjugated diolefin polymer rubber, a filler, and from 0.5 to 10%, on the weight of the filler, of a vinyl silthiane, and heating the mixture at a temperature of at least 250° F. to effect reaction between said vinyl silthiane and said filler, the said vinyl silthiane being the product of interaction of vinyltrichlorosilane with hydrogen sulfide passed in gaseous form into a solution at reflux temperature of said vinyltrichlorosilane, in the presence of a hydrogen chloride acceptor, to effect liberation of 3 moles of hydrogen chloride for each mole of vinyltrichlorosilane, whereby there is formed a vinyl silthiane having the recurring unit structure

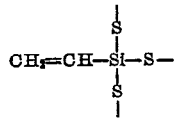

each of the dangling valences attached to sulfur in said unit structure being in turn attached to another silicon atom to which is attached a vinyl group, said vinyl silthiane responding to the empirical formula $$CH_2=CH-Si-S_{3/2}$$

and being a waxy solid a room temperature and a viscous liquid at 125° C.

3. The method which comprises commingling a sulfur-vulcanizable conjugated diolefin polymer rubber, a filler, and from 0.5 to 10%, on the weight of the filler, of a vinyl silthiane, and heating the mixture while masticating it at a temperature of from 250° to 400° F. to effect reaction between said vinyl silthiane and said filler, the vinyl sithliane being the product of interaction of vinyltrichlorosilane with hydrogen sulfide passed in gaseous form into a solution at reflux temperature of vinyltrichlorosilane, in the presence of a hydrogen chloride acceptor, to effect liberation of 3 moles of hydrogen chloride for each mole of vinyltrichlorosilane, whereby there is formed a vinyl silthiane having the recurring unit structure

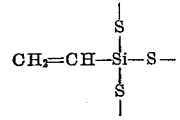

each of the dangling valences attached to sulfur in said unit structure being in turn attached to another silicon atom to which is attached a vinyl group, said vinyl silthiane responding to the empirical formula $$CH_2=CH-Si-S_{3/2}$$

and being a waxy solid at room temperature and a viscous liquid at 125° C.

4. A vulcanizate of a mixture of a sulfur-vulcanizable conjugated diolefin polymer rubber, a filler, and from 0.5 to 10%, on the weight of said filler, of a vinyl silthiane, said vinyl silthiane being the product of interaction of a vinylchlorosilane wherein the sum of the vinyl and chloro groups is equal to 4 with hydrogen sulfide passed in gaseous form into a solution at reflux temperature of said vinylchlorosilane, in the presence of a hydrogen chloride acceptor, to effect liberation of an amount of hydrogen chloride corresponding to the amount of chlorine in the vinylchlorosilane, whereby there is formed a vinyl silthiane consisting of vinyl groups, silicon atoms and sulfur atoms, each of said silicon atoms being chemically attached to vinyl groups and sulfur atoms, the sum of the number of vinyl groups and sulfur atoms to which each of said silicon atoms is attached being equal to 4.

5. A vulcanizate of a mixture of a sulfur-vulcanizable conjugated diolefin polymer rubber, a filler, and from 0.5 to 10%, on the weight of said filler, of a vinyl silthiane, said vinyl silthiane being the product of interaction of vinyltrichlorosilane with hydrogen sulfide passed in gaseous form into a solution at reflux temperature of said vinyltrichlorosilane, in the presence of a hydrogen chloride acceptor, to effect liberation of 3 moles of hydrogen chloride for each mole of vinyltrichlorosilane, whereby there is formed a vinyl silthiane having the recurring unit structure

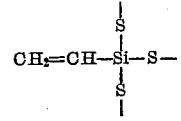

each of the dangling valences attached to sulfur in said unit structure being in turn attached to another silicon atom to which is attached a vinyl group, said vinyl silthiane responding to the empirical formula $$CH_2=CH-Si-S_{3/2}$$

and being a waxy solid at room temperature and a viscous liquid at 125° C.

6. A vulcanizate as set forth in claim 5 wherein said filler is silica.

7. A vulcanizate as set forth in claim 5 wherein said filler is calcium silicate.

8. A vulcanizate as set forth in claim 5 wherein said filler is clay.

9. A vulcanizate as set forth in claim 5 wherein said filler is carbon black.

10. A vulcanizate as set forth in claim 5 wherein said filler is calcium carbonate.

References Cited in the file of this patent

UNITED STATES PATENTS

| | | |
|---|---|---|
| 2,567,724 | Moody | Sept. 11, 1951 |
| 2,578,605 | Sears et al. | Dec. 11, 1951 |
| 2,582,795 | Prentiss et al. | Jan. 15, 1952 |